(No Model.)
E. THOMSON.
WINDING OF DYNAMO ELECTRIC MACHINES OR MOTORS.
No. 544,396. Patented Aug. 13, 1895.
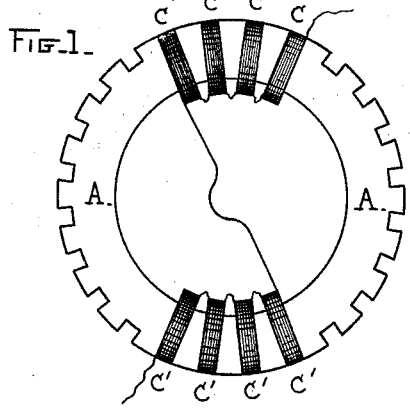
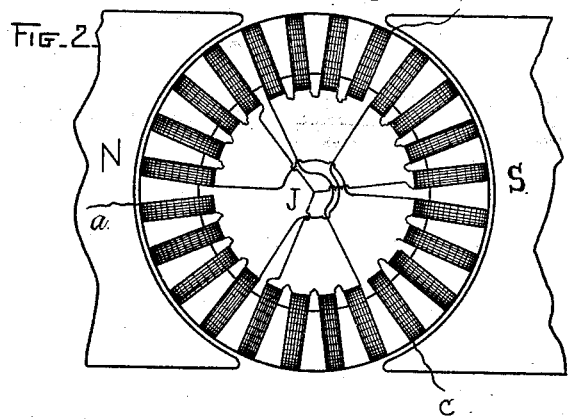
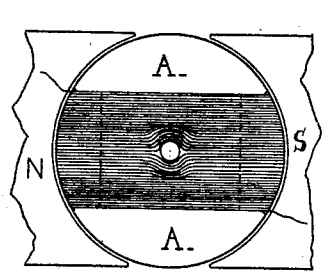
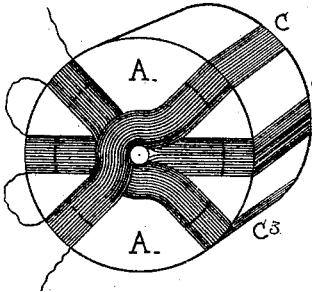
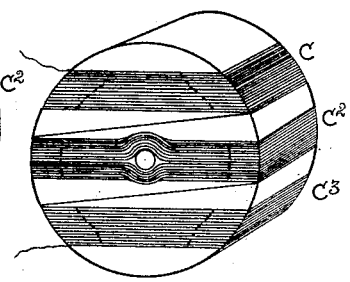
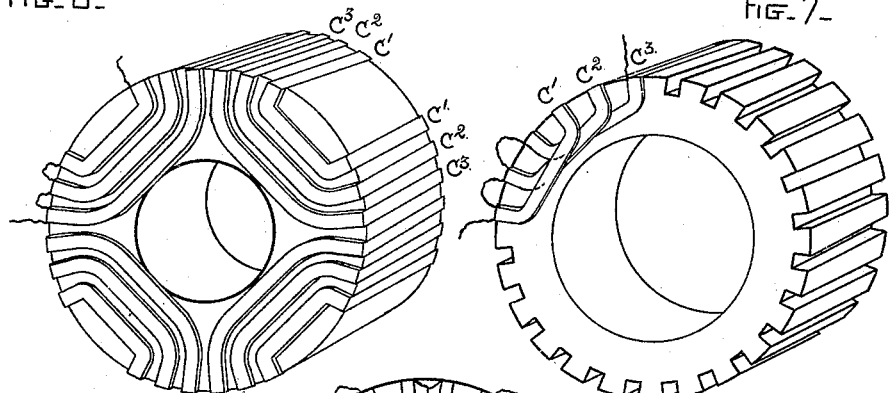
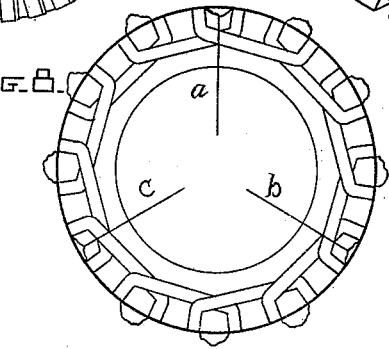
WITNESSES
Harry O. Westendarp
John W. Gibboney
INVENTOR
Elihu Thomson

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

WINDING OF DYNAMO-ELECTRIC MACHINES OR MOTORS.

SPECIFICATION forming part of Letters Patent No. 544,396, dated August 13, 1895.

Application filed January 27, 1894. Serial No. 498,182. (No model.)

*To all whom it may concern:*

Be it known that I, ELIHU THOMSON, a citizen of the United States, residing at Swampscott, in the county of Essex and Commonwealth of Massachusetts, have invented a new and useful Improvement in the Construction and Winding of Dynamo-Electric Machines, Motors, and other Similar Electrical Apparatus, of which the following is a description.

The object of my invention is to secure, in the operation of machines in which pulses of alternating currents are either generated or employed in coils on toothed structures of iron—such as projection armatures of dynamos, motors, motor-generators—a reduction of the self-inductive effects and a smoother action than would be obtained by methods hitherto in vogue.

My invention is also applicable to various types of electrical apparatus, such as the inducing portion of motors for alternating currents of different varieties.

My invention consists, briefly, in winding a coil in which a single alternating impulse of current is to be generated in several convolutions or sets of convolutions between the adjoining or successive projections of iron on the core of the structure, instead of bunching all the wire in one space between larger projections, as has been customary prior to my invention. By this means the magnetic actions in the machine are subject to less violent fluctuations, and at the same time the self-induction of the section of wire generating or using an alternate impulse of current is kept down far below what it would be if the wire were massed in a single space, inasmuch as the self-induction increases according to the square of the number of conductors associated in each slot.

The invention will be understood by reference to the accompanying figures.

Figure 1 represents a toothed armature with a single wire coil wound thereon in accordance with my invention. Fig. 2 represents a three-phase winding on a similar armature in relation to the field-poles. Fig. 3 shows the old Siemens armature. Fig. 4 is the same modified in accordance with my invention, and Fig. 5 another form. Fig. 6 is a view of an armature embodying my invention as applied to a four-pole structure. Fig. 7 is a modification involving the same principle. Fig. 8 is a further application of my invention to a different winding.

A A, Fig. 1, represent a laminated armature in the form of a ring made of sheet-iron disks or plates with projections or teeth extending outwardly therefrom. Upon this structure I wind a coil or circuit in which a single alternating current impulse is to be generated or utilized. Instead of making the spaces between the projections large in extent, sufficient to take in all the coil or portion of the circuit on one side of the armature, as has been customary prior to my invention, I find much better results are obtained by distributing or interspersing the coil between a number of different projections, so that in the passage of the coils in a revolution the various parts reach a given point in succession and not as an entire body, whereby the self-inductive effects decrease and less violent magnetic fluctuations are produced in the structure. For example, the winding C C C C connected to the work as one single coil, as is shown, is interspersed or set apart between successive projections, while C' C' C' C' is a diametrically-opposite winding working in conjunction therewith, the whole forming a winding interspersed between several teeth and consisting of a single circuit only in which an alternating impulse is to be generated or used. Thus if in Fig. 2 such an armature as has been shown in Fig. 1 is to be employed in a dynamo, it may be revolved between field-poles N S when mounted on a suitable shaft and be wound as there shown with three such circuits as are found in Fig. 1, three corresponding ends of which are joined in a common connection at J, while their other free ends *a b c* are the terminals of the three-phase winding so provided, each of the circuits of which *a b c* are the terminals being composed of a number of divided sections of the winding interspersed between a number of teeth on the armature. By this arrangement smoothness of action in the winding is secured, as against a structure in which each winding is massed in one space on each side of the armature. The terminals *a b c* may be each connected to a ring for three-phase alternating currents, or they may be carried to the three segments of a commutator, as in the well-known Thomson-Houston dynamo; and the effect of constructing the coils in accordance with my invention would be obtained in each case—that is, a smooth action, diminished magnetic fluctuations, and a lessened self-induction of the circuits on the armature or structure so provided with coils. While in Fig. 2 the arrangement is shown as applied to a bipolar structure, it would, of course, require but a mere duplication of the windings to be applicable to a four-pole or a multipolar structure.

To illustrate my invention I refer, further, to Figs. 3, 4, and 5, where, in Fig. 3, the field-poles N S have included between them the ordinary old-style Siemens shuttle-wound armature, of which the core is, as is well known, an iron structure having two longitudinal grooves in which the wire is laid, while the parts A A are pole-pieces or projections on the armature, two in number in a bipolar structure. In this case the coil is wound as a single body of wire in between the polar portions or cheeks A A, and the coil acts to generate a single alternating impulse of current during revolution, which may be commuted or not. I instance the ordinary forms of magneto-generators used in telephone apparatus as being provided with this winding as an arrangement where the current is not commuted, and the early forms of Siemens dynamos with two half-circle segments in the commutator where the currents are commuted. In such a structure the revolution of the armature during the development of alternating currents in the coil wound thereon produces also violent fluctuations in the state of magnetism of the field-poles, owing to the varying closure of the magnetic circuit in different parts of said poles, and at the same time the self-induction of the coil wound on said armature is nearly at a maximum, which effect limits the output which may be obtained from the machine and gives rise to excessive distortion of the field under load. The tendency is also to heat both the core of the armature and the field-poles by fluctuations of magnetism. I modify this structure in my invention by dividing up the coil into sections, as $C\ C^2\ C^3$, Fig. 4, while maintaining them in a series arrangement or continuous winding, but placing the sections in a multiple of the grooves provided in the first form, Fig. 3. In Fig. 4 I have shown six grooves provided instead of two, and three coils wound in these grooves between the six projections. The coils are electrically one, as they are in Fig. 3, and act together in delivering alternating impulses, which may be commuted or not. The generating-circuit, or the circuit which is traversed by current in a motor or other similar electric apparatus, is thus seen to be divided or interspersed between a number of projections, and, while three sections are shown interspersed in Fig. 4, it is manifestly the case that this division may be carried much further, which would in many cases enhance the advantage accruing from my invention.

In Fig. 4, while the coil-section or parts of the generating-coil $C\ C^2\ C^3$ are shown crossing each other, they may be applied as in Fig. 5, where they lie in the six grooves provided on an armature, but in planes nearly parallel to each other, though still acting as one generating circuit or coil. Such an armature as in Fig. 5 may be wound for a four-pole field, as in Fig. 6, where the coil-sections or parts of a single coil or generating-circuit are situated within each other, as at $C'\ C'\ C^2\ C^2\ C^3\ C^3$, four such generating-conductors being provided around the armature with appropriate projections from the iron core between the different convolutions or sets of convolutions occupying the spaces.

In Fig. 7 the coil-sections $C\ C^2\ C^3$, which form a single conductor on the armature or other structure, are interspersed between teeth, as indicated, and connected in series and overlie each other, this arrangement resembling that of Fig. 4, but adapted for a structure having more poles. But one circuit is shown on the structure, and the projections and spaces for other windings of a similar character are indicated. It may be said here that nothing in my invention is to be held as excluding a structure with numerous projections from the core and with coils forming the generative circuit or circuits using alternating current impulses singly interspersed between several projections thereon in succession or adjacent, together with other coils or generating-circuits led parallel thereto in the same spaces or projections, or between the same projections, or in other spaces between projections specially provided and yet separate from those belonging to the first-mentioned coil, it being only necessary in my invention that the convolutions traversed by a single alternating impulse be spread about over the surface of the armature with iron projections in between, instead of being bunched in a single space, as was done prior to my invention, with the current moving in a given direction and returning such current in any other such space, either outside of the armature or in the open spaces inside the ring or parts corresponding thereto.

Fig. 8 shows a three-phase winding embodying my invention, which consists in a series of coils or sections connected to three leads $a\ b\ c$, constituting a three-phase winding with somewhat similar properties to that shown in Fig. 2. Here the coil-sections connected between $a\ b\ c$ are four in number, successively placed between the projections covering an angle between the terminals $a\ b$ on the structure, which angle is approximately one hundred and twenty degrees. Similarly the coils between $a\ c$ are disposed, and those between $b$ and $c$, the current from any one terminal *a* distributing itself through coils on the one side toward *b*, for example, and on the other side toward, for example, *c*. The figure is a simple form, such as would be suitable for use in motors or dynamos with three phases of current applied or generated, and would be extended in well-known ways to make it adaptable to multipolar structures, as by extending the same succession of coils for larger diameters or repeating the sequence a number of times on the periphery.

Having thus described my invention, what I claim, and desire to secure by Letters Patent, is—

1. In a dynamo electric machine, motor, or similar electrical apparatus, a laminated core provided with projecting iron extensions between the coils, and having each single coil or circuit which generates or utilizes an alternating impulse, divided and interspersed between projections that occupy different positions around the structure.

2. In a dynamo or motor a projection armature the induction circuits of which, for each alternating impulse, are divided into portions which are wound between successive projections and connected in series, so that the currents in them will be in synchronism in the different divisions of the coil, while the electro-motive-forces may or may not be in synchronism.

3. In a dynamo electric machine or laminated structure having projections, a number of conductors wound between successive projections the electro-motive-force of which would not necessarily be in phase, but the current in which is of one phase and is the resultant of the current producing tendencies in each of the divisions.

In witness whereof I have hereunto set my hand this 25th day of January, 1894.

ELIHU THOMSON.

Witnesses:
JOHN W. GIBBONEY,
BENJAMIN B. HULL.